May 28, 1968   A. L. MUNSON ET AL   3,385,957
ELECTRONICALLY CONTROLLED HEATER
Filed Aug. 9, 1965

INVENTORS
ARDEN L. MUNSON
JAMES ARTHUR HIRSCH
BY
ATTORNEY

United States Patent Office 3,385,957
Patented May 28, 1968

3,385,957
ELECTRONICALLY CONTROLLED HEATER
Arden L. Munson, Logansport, and James A. Hirsch, Indianapolis, Ind., assignors to P. R. Mallory & Co. Inc., Indianapolis, Ind., a corporation of Delaware
Filed Aug. 2, 1965, Ser. No. 476,454
11 Claims. (Cl. 219—501)

ABSTRACT OF THE DISCLOSURE

An adjustable unijunction-transistor control circuit including a thermistor and operating directly from an AC line controls the firing of an SCR connected in series with a heater across the AC line. When the AC power is initially applied, a diode connected across the SCR through NC relay contacts allows full-wave power to flow through the heater. When the SCR turns off as the heater reaches proper temperature, the relay latches open to disconnect the diode. Heater temperature is thereafter maintained as necessary only by half-wave power through the SCR. The relay does not unlatch until AC power is manually removed from the entire circuit.

---

The present invention relates to controlled heaters and more particularly to the means and method for providing a solid state electronic circuit for controlling said heaters.

There exists a multiplicity of equipment applications wherein a controlled heater is required. In many of these applications the heater must be accurately and reliably controlled for long periods of time in order for a process to be productive or for the equipment to function properly.

Accordingly, the present invention provides a novel, efficient, and economical solution to the heater control problems of the aforementioned equipment applications. There is presented herein an adjustable, solid state electronic circuit for controlling an electric heater within close limits and for applying either full-wave or half-wave power from an alternating current power source to heating elements of the heater. The full-wave power can be used for rapid warmup of the heater and the half-wave power permits fine control of the heater after it is up to temperature. A sensing element, such as a temperature sensing resistor, functions as a variable component in the solid state control circuit. Hence, the output of the control circuit is dependent on a predetermined state of the sensing element. Solid state components are used to obtain long-lived switching.

Only one relay is required, in the embodiment shown in this specification, to remove the full-wave power from the heating elements so as to apply half-wave power. Since full-wave power will generally be required only during infrequent warmup, relay switching is believed to be sufficiently long-lived.

A particularly novel feature of the present invention is the fact that no isolation from the alternating current source is required. This feature represents a substantial cost savings.

Since a relay is used to remove full-wave power when the heater is up to operating condition, an indicating means can be coupled to the relay to inform an operator that the equipment is ready for operation.

It is an object of the present invention, therefore, to provide a controlled heater for use in a wide variety of equipment applications.

A further object of the present invention is to provide a solid state electronic circuit for controlling a heater.

A further object of the present invention is to provide an adjustable solid state electronic circuit for controlling a heater.

A further object of the present invention is to provide a solid state temperature control circuit with an output dependent on a predetermined state of a temperature responsive element.

Another object of the present invention is to provide an electronic circuit for controlling a heater which will apply either full-wave or half-wave power to heating elements of said heater.

Yet another object of the present invention is to provide a control for a heater which is extremely accurate and free from temperature excursions.

Yet another object of the present invention is to provide a solid state electronic circuit for controlling a heater that will operate on a half sine wave developed by a Zener diode coupled across an alternating current source.

Still another object of the present invention is to provide an electronic circuit for controlling a heater that can be used to indicate when the heater is at an operating temperature.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Generally speaking, the present invention involves a controlled heater comprising, a temperature responsive element, a solid state control circuit coupled to said temperature responsive element so as to provide an output in response to a predetermined state of said temperature responsive element, a power control circuit coupled to said control circuit and to an alternating current power source, said power control circuit being responsive to said output of said control circuit so as to apply full-wave and half-wave power to heating elements of said heater, and a means for removing said full-wave power from said heating elements so as to apply said half-wave power to said heating elements when said temperature responsive element reaches a desired temperature.

Figure 1:
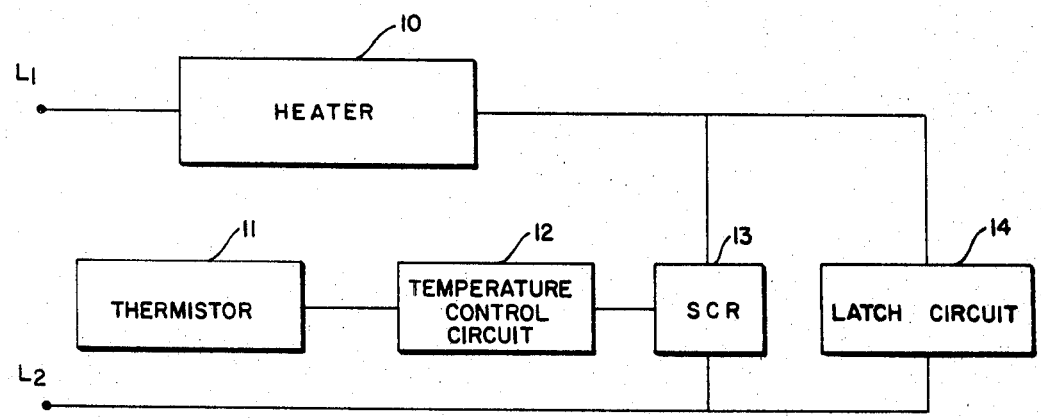
FIGURE 1 is a block diagram of the invention showing the heater, thermistor, temperature control circuit, silicon controlled rectifier, and latch circuit.

Referring now to the drawing, and particularly to the block diagram shown in FIGURE 1, the component arrangement of the present invention can be visualized in conjunction with the following description. The heater 10 consisting of a plurality of heating elements, and thermistor 11 may or may not be in physical proximity and are not electrically connected.

The thermistor 11, a temperature sensing resistor, is connected to the temperature control circuit 12 and functions as a part of that circuit as will be described in subsequent paragraphs. Although a thermistor is referred to in this specification, other types of temperature sensing or temperature responsive elements could be used in a solid state circuit for controlling a heater. For this reason, the specification and claims will refer to a means for sensing temperature, a temperature responsive element, and a temperature sensing element. The temperature control circuit 12 is connected to the silicon controlled rectifier 13 which is in parallel with the latch circuit 14 and in series with the heater 10. The latch circuit 14 which is also in series with the heater 10, provides additional power for the heater 10 in a manner that will be described in subsequent paragraphs.

The silicon controlled rectifier 13 and latch circuit 14 make up the power control circuit which is in series with the heater 10. The latch circuit 14 is a latching means for open circuiting a portion of the power control circuit.

Figure 2:
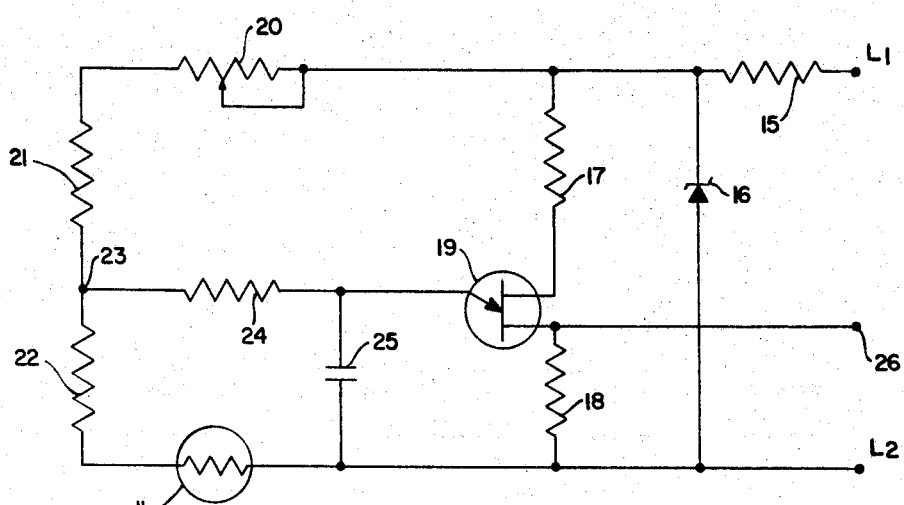
FIGURE 2 is a schematic of the basic temperature control circuit.

Referring now to FIGURE 2 we see a schematic of a solid state temperature control circuit 12 showing a unijunction transistor 19 for triggering the silicon controlled rectifier 13 or any solid state switching means. Resistor 15 and Zener diode 16 form a dual purpose voltage divider network connected across a first side of an alternating current source, hereinafter referred to as L1 and a second side of said alternating current source, hereinafter referred to as L2. The temperature control circuit 12 is connected across Zener diode 16 and includes a temperature compensating resistor 17 and a load resistor 18 for the unijunction transistor 19. There is a series network of resistors connected across Zener diode 16 consisting of an adjustable resistor 20, current limiting resistor 21, current limiting resistor 22, and the thermistor 11. The adjustable resistor 20 is a means for selectively adjusting the temperature control circuit so as to provide an output at various states of the thermistor 11. A first side of resistor 24 is connected to the junction 23, which is midpoint between current limiting resistor 21 and current limiting resistor 22, and a second side of resistor 24 is connected to the emitter of unijunction transistor 19. A capacitor 25 is coupled across the emitter of unijunction transistor 19 and the anode of Zener diode 16. The output of unijunction transistor 19 is provided to terminal 26 which is connected to the gate of the silicon controlled rectifier 13.

Figure 3:
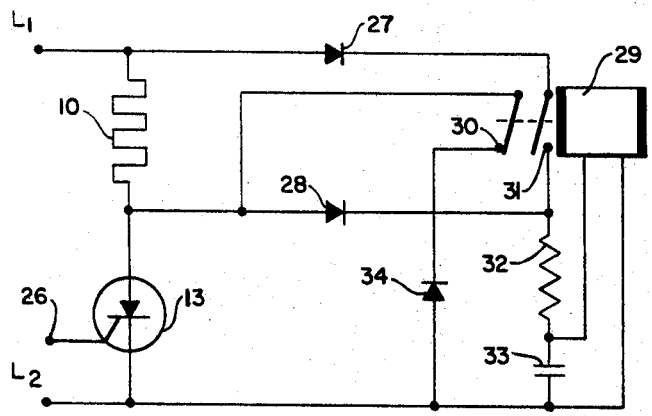
FIGURE 3 is a schematic of the power control circuit which includes the silicon controlled rectifier and latch circuit.

Referring now to FIGURE 3 we see a schematic of the power control circuit 14 which is also connected across L1 and L2. The heater 10 and silicon controlled rectifier 13 are connected in series across L1 and L2 and can conduct current in one direction if the silicon controlled rectifier 13 is appropriately triggered. The anode of diode 28 is connected to the anode of the silicon controlled rectifier 13 and one side of the heater 10 and the cathode of diode 28 is connected to a first side of the normally open contact 31 of relay 29 and to a first side of current limiting resistor 32. One input of relay 29 is connected to a second side of current limiting resistor 32, and the other input is connected to L2. The anode of diode 27 is connected to L1 and the cathode of diode 27 is connected to a second side of the normally open contact 31 of relay 29. The anode of diode 34 is connected to L2, and the cathode of diode 34 is connected to the normally closed contact 30 of relay 29, and through contact 30 to the anode of silicon controlled rectifier 13. A capacitor 33 is coupled across relay 29. The relay 29 and diode 27 and 28 function as a means for removing full-wave power from heater 10 so as to apply half-wave power to said heater.

With the above description of components and circuitry in mind, and by making reference to the drawing figures, the following analysis of operation will serve to convey the details of the heater control functioning. The temperature control circuit 12 shown in FIGURE 2 is a basic half-wave control circuit utilizing a thermistor 11 as a temperature sensing resistor or a temperature responsive element. As stated previously resistor 15 and Zener diode 16 form a dual purpose voltage divider. When L1 is positive with respect to L2, the Zener voltage of Zener diode 16 is developed across Zener diode 16, allowing the remainder of the circuit to function. When L1 is negative with respect to L2, Zener diode 16 is forward biased and conducts, preventing voltage of reverse polarity from damaging the other components. If resistor 15 is of sufficiently low value, the voltage across Zener diode 16 will be substantially a half sine wave, clipped at the Zener voltage. Typical values would be 5000 ohms for resistor 15 and 15 volts for Zener diode 16 with 120 volts applied across L1 and L2.

When thermistor 11 is cold, the ratio of the sum of the resistances of current limiting resistor 22 and thermistor 11 to the sum of the resistances of the adjustable resistor 20, current limiting resistors 21 and 22, and thermistor 11 is slightly less than 1.000 and current can flow from junction 23 through resistor 24 to charge capacitor 25. When the voltage across capacitor 25 reaches the triggering voltage of unijunction transistor 19, the unijunction transistor 19 will be triggered and provide an output for firing the silicon controlled rectifier 13. The triggering voltage of the unijunction transistor 19 is approximately the product of the standoff ratio of unijunction transistor 19 and the voltage across the Zener diode 16. Resistor 24 is of sufficient value to prevent loading of the network comprised of adjustable resistor 20, current limiting resistors 21 and 22 and the thermistor 11 and to prevent premature "latching on" of unijunction transistor 19. Capacitor 25 is of sufficient value to store energy to fire the silicon controlled rectifier 13. Typical values for resistor 24 and capacitor 25 are 4700 ohms and 0.01 microfarad respectively, with a product, time constant, of 47 microseconds. Because the time constant is as short as one electrical degree, the application of power to the circuit is not delayed significantly.

As thermistor 11 is warmed up to the desired operating temperature, the ratio of the sum of the resistances of the current limiting resistor 22 and the thermistor 11 to the sum of the resistances of the adjustable resistor 20, current limiting resistor 21, current limiting resistor 22 and thermistor 11 drops to near the unijunction transistor 19 standoff ratio causing the voltage at junction 23 to drop. At that point, the unijunction transistor 19 will trigger or not depending on slight changes in the voltage at junction 23. Thus, a sensitive heater control is established with the triggering of unijunction transistor 19 and consequently the firing of silicon controlled rectifier 13 to apply power to the heater 10, being dependent on slight changes in the resistance of the thermistor 11.

The self heating effect in the thermistor 11 is minimized because the voltage across the thermistor 11 is substantially the same whether the heater 10 is on or not. If resistor 15 was connected to the anode of the silicon controlled rectifier 13, as is common in silicon controlled rectifier circuit design, the thermistor 11 would cool when the heater 10 is on and warm when the heater 10 is off, tending to cause larger temperature excursions.

Referring now to FIGURE 3, we see the power control circuit coupled across L1 and L2. When an alternating current is applied across L1 and L2, the heater 10 is supplied nearly full line voltage. On one alternation the current flows through diode 34 and the normally closed contact 30 of relay 29 and on the next alternation it flows through the silicon controlled rectifier 13 which is turned on by the temperature control circuit 12 described in FIGURE 2. This action is referred to as double-power warmup or full-wave power warmup.

When the heater has come up to temperature, thermistor 11 does not cause the temperature control circuit 12 to turn on the silicon controlled rectifier 13, consequently current can flow through diode 28 and current limiting resistor 32 to charge capacitor 33 and cause relay 29 to operate. Once relay 29 is operated and normally open contact 31 is closed, the current flowing through diode 27 and the normally open contact 31 will hold relay 29 in an operating condition. When the relay 29 is operated, the normally closed contact 30 opens up to end the period of full-wave power warmup through diode 34 and start the half-wave power warmup. Obviously, the relay 29 can be used to indicate when the thermistor 11 first reaches the desired temperature.

The controlled heater of the present invention, as hereinbefore described in one of its embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. A controlled heater comprising, a temperature sensing resistor, a unijunction transistor control circuit coupled to said temperature sensing resistor so as to provide an output in response to a predetermined state of said temperature sensing resistor, a means for selectively adjusting said control circuit, so as to provide an output at various states of said temperature sensing resistor, a power control circuit coupled to said control circuit and to an alternating current power source, said power control circuit being responsive to said output of said control circuit so as to apply full-wave and half-wave power to heating elements of said heater, said power control circuit including a latch circuit for automatically removing said full-wave power from said heating elements so as to apply said half-wave power when said temperature sensing resistor reaches a desired temperature, only said half-wave power being thereafter applied to maintain said temperature sensing resistor at said desired temperature.

2. A controlled heater comprising, a temperature responsive element, a solid state control circuit coupled to said temperature responsive element so as to provide an output in response to a predetermined state of said temperature responsive element, a power control circuit coupled to said control circuit and to an alternating current power source, said power control circuit including a silicon controlled rectifier and a diode in series with heating elements of said heater, said silicon controlled rectifier being in parallel with said diode, said silicon controlled rectifier nad said diode being responsive to said output of said control circuit so as to provide full-wave power from said alternating current source to said heating elements of said heater, a latching means for automatically open circuiting said diode so as to apply half-wave power to said heating elements when said temperature responsive element reaches a desired temperature, only said half-wave power being thereafter applied to maintain said temperature responsive element at said desired temperature.

3. A controlled heater comprising, a temperature responsive element, a solid state control circuit coupled to said temperature responsive element so as to provide an output in response to a predetermined state of said temperature responsive element, a means for selectively adjusting said control circuit so as to provide an output at various states of said temperature responsive element, a power control circuit coupled to said control circuit and to an alternating current power source, said power control circuit including a silicon controlled rectifier and a diode in series with heating elements of said heater, said silicon controlled rectifier being in parallel with said diode, said silicon controlled rectifier and said diode being responsive to said output of said control circuit so as to provide full-wave power from said alternating current source to said heating elements of said heater, a latching means for automatically open circuiting said diode so as to apply half-wave power to said heating element when said temperature responsive element reaches a desired temperature, only said half-wave power being thereafter applied to maintain said temperature responsive element at said desired temperature.

4. A controlled heater comprising, a temperature responsive element, a solid state control circuit coupled to said temperature responsive element so as to provide an output in response to a predetermined state of said temperature responsive element, a means for selectively adjusting said control circuit so as to provide an output at various states of said temperature responsive element, a power control circuit coupled to said control circuit and to an alternating current power source, said power control circuit including a silicon controlled rectifier and a diode in series with heating elements of said heater, said silicon controlled rectifier being in parallel with said diode, said silicon controlled rectifier and said diode being responsive to said output of said control circuit so as to provide full-wave power from said alternating current source to said heating elements of said heater, said power control circuit including a latching means for automatically open circuiting said diode so as to apply half-wave power to said heating elements when said temperature responsive element reaches a desired temperature, only said half-wave power being thereafter applied to maintain said temperature responsive element at said desired temperature.

5. A controlled heater comprising, a temperature sensing resistor, a solid state control circuit coupled to said temperature sensing resistor so as to provide an output in response to a predetermined resistance of said temperature sensing resistor, a power control circuit coupled to said control circuit and to an alternating current power source, said power control circuit including a solid state switching means and a diode in series with heating elements of said heater, said solid state switching means being in parallel with said diode, said solid state switching means and said diode being responsive to said output of said control circuit so as to provide full-wave power from said alternating current source to said heating elements of said heater, a latching means for automatically open circuiting said diode so as to apply half-wave power to said heating elements when said temperature sensing resistor reaches a desired temperature, only said half-wave power being thereafter applied to maintain said temperature sensing resistor at said desired temperature.

6. A controlled heater comprising, a temperature sensing resistor, a unijunction transistor control circuit coupled to said temperature sensing resistor so as to provide an output in response to a predetermined resistance of said temperature sensing resistor, a means for selectively adjusting said control circuit so as to provide an output at various resistances of said temperature sensing resistor, a power control circuit coupled to said control circuit and to an alternating current power source, said power control circuit including a solid state switching means and a diode in series with heating elements of said heater, said solid state switching means and said diode being responsive to said output of said control circuit so as to provide full-wave power from said alternating current source to said heating elements of said heater, a latching means for automatically open circuiting said diode so as to apply half-wave power to said heating elements when said temperature sensing resistor reaches a desired temperature, only said half-wave power being thereafter applied to maintain said temperature sensing resistor at said desired temperature.

7. A controlled heater comprising, a temperature sensing means, a solid state circuit means responsive to said temperature sensing means so as to provide an output dependent on a predetermined state of said temperature sensing means, said circuit means coupled to a means for applying full-wave power from an alternating current power source to heating elements of said heater when said temperature sensing means is below a desired temperature, a latching means for automatically removing said full-wave power so as to apply half-wave power from said alternating current power source when said temperature sensing means is at said desired temperature, only said half-wave power being thereafter applied to maintain said temperature sensing means at said desired temperature.

8. A controlled heater comprising, a temperature sensing resistor, a solid state circuit means responsive to said temperature sensing resistor so as to provide an output dependent on a predetermined state of said temperature sensing resistor, said circuit means coupled to a means for applying full-wave power from an alternating current power source to heating elements of said heater latching when said temperature sensing resistor is below a desired temperature, a means for automatically removing said full-wave power so as to apply half-wave power from said alternating current power source when said temperature sensing resistor is at said desired temperature, only said half-wave power being thereafter applied to maintain said temperature sensing resistor at said desired temperature.

9. A controlled heater comprising, a solid state temperature control circuit, said temperature control circuit coupled across a Zener diode, said Zener diode coupled across an alternating current power source in series with a current limiting resistor so as to provide a proper voltage for operating said temperature control circuit, said temperature control circuit including a unijunction transistor coupled so as to provide a firing pulse to a silicon controlled rectifier when said unijunction transistor is triggered, said unijunction transistor being triggered by a voltage which is dependent on a predetermined value of a temperature sensing resistor, said silicon controlled rectifier coupled in series with heating elements of said heater, said silicon controlled rectifier and said heating elements coupled across an alternating current power source, said silicon controlled rectifier being responsive to said firing pulse from said unijunction transistor so as to permit the flow of current from said alternating current power source in a first direction through said heating elements, a diode coupled in series with said heating elements and in parallel with said silicon controlled rectifier, said diode coupled to said alternating current power source so as to permit the flow of current in a second direction through said heating elements, a means for open circuiting said diode so as to prevent current flow in said second direction through said heating elements when said temperature sensing resistor is at a desired temperature, and said current flow in said first direction being applied to maintain said temperature sensing resistor at said desired temperature.

10. A controlled heater comprising, a solid state temperature control circuit, said temperature control circuit coupled across a Zener diode, said Zener diode coupled across an alternating current power source in series with a current limiting resistor so as to provide a proper voltage for operating said temperature control circuit, said temperature control circuit including a unijunction transistor coupled so as to provide a firing pulse to a silicon controlled rectifier when said unijunction transistor is triggered, said unijunction transistor being triggered by a voltage which is dependent on a predetermined value of a temperature sensing resistor, said silicon controlled rectifier coupled in series with heating elements of said heater, said silicon controlled rectifier and said heating elements of said heater coupled across said alternating current power source, said silicon controlled rectifier being responsive to said firing pulse from said unijunction transistor so as to permit the flow of current from said alternating current power source in a first direction through said heating elements, a diode coupled in series with said heating elements and in parallel with said silicon controlled rectifier, said diode coupled to said alternating current power source so as to permit the flow of current in a second direction through said heating elements, a latching means coupled so as to open circuit said diode to prevent current flow in said second direction through said heating elements when said temperature sensing resistor is at a desired temperature, and said current flow in said first direction being applied to maintain said temperature sensing resistor at said desired temperature.

11. A controlled heater comprising, a solid state temperature control circuit, said temperature control circuit coupled across a Zener diode, said Zener diode coupled across an alternating current power source and in series with a current limiting resistor so as to provide a proper voltage for operating said temperature control circuit, a series network of resistors including an adjustable resistor, a first current limiting resistor, a second current limiting resistor, and a temperature sensing resistor coupled across said Zener diode, a resistor coupled between a junction of said first and said second current limiting resistors and an emitter of a unijunction transistor so as to charge a first capacitor, said first capacitor coupled from said emitter to an anode of said Zener diode so as to trigger said unijunction transistor when charged with a proper voltage, a load resistor coupled between a first base of said unijunction transistor and said anode of said Zener diode and a temperature compensating resistor coupled between a second base of said unijunction transistor and a cathode of said Zener diode, said temperature control circuit functioning to provide an output when a voltage equal to said unijunction transistor triggering voltage is developed at said junction between said first and said second current limiting resistor, said voltage being dependent on a value of said temperature sensing resistor, a silicon controlled rectifier in series with heating elements of said heater, said silicon controlled rectifier and said heating elements coupled across an alternating current power source, said silicon controlled rectifier being responsive to said output of said temperature control circuit so as to permit the flow of current from said alternating current power source in a first direction through said heating elements, a first diode coupled in series with said heating elements and in parallel with said silicon controlled rectifier, said first diode coupled to said alternating current power source so as to permit the flow of current in a second direction through said heating elements, a second diode coupled to said heating element and a third current limiting resistor so as to charge a second capacitor, said second capacitor coupled in parallel with a coil of a relay so as to energize said relay when charged with sufficient voltage, said relay operating to open circuit said first diode to prevent current flow in said second direction through said heating elements when said temperature sensing resistor is at a desired temperature, said current flow in said first direction being applied to maintain said temperature sensing resistor at said desired temperature, and a third diode coupled to said alternating current and to said third current limiting resistor so as to keep said relay energized.

References Cited

UNITED STATES PATENTS

| 3,061,744 | 10/1962 | Spira | 315—205 X |
| 3,114,025 | 12/1963 | Blauvelt et al. | 219—501 |
| 3,136,877 | 6/1964 | Heller | 219—501 X |
| 3,149,224 | 9/1964 | Horne et al. | 219—501 X |
| 3,299,319 | 1/1967 | Nomura | 315—205 |
| 3,299,344 | 1/1967 | Werts | 219—501 |
| 3,299,345 | 1/1967 | Werts | 219—501 X |
| 3,299,346 | 1/1967 | Gambill | 219—501 X |
| 3,305,766 | 2/1967 | Gambill | 219—501 X |
| 3,020,384 | 2/1967 | Murphy | 219—519 X |

RICHARD M. WOOD, *Primary Examiner.*

L. H. BENDER, *Assistant Examiner.*